United States Patent
Hashimoto et al.

(10) Patent No.: US 8,586,891 B2
(45) Date of Patent: Nov. 19, 2013

(54) WIRE ELECTRICAL DISCHARGE MACHINING APPARATUS

(75) Inventors: Takashi Hashimoto, Chiyoda-ku (JP);
Yasuo Onodera, Chiyoda-ku (JP);
Tatsushi Sato, Chiyoda-ku (JP);
Koichiro Hattori, Chiyoda-ku (JP);
Hisashi Yamada, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 1139 days.

(21) Appl. No.: 12/377,526

(22) PCT Filed: Oct. 24, 2006

(86) PCT No.: PCT/JP2006/321177
§ 371 (c)(1),
(2), (4) Date: Feb. 13, 2009

(87) PCT Pub. No.: WO2008/050403
PCT Pub. Date: May 2, 2008

(65) Prior Publication Data
US 2010/0224596 A1    Sep. 9, 2010

(51) Int. Cl.
*B23H 7/00*    (2006.01)
*B23H 7/14*    (2006.01)
*B23H 1/02*    (2006.01)

(52) U.S. Cl.
USPC .................. 219/69.12; 219/69.13; 219/69.18

(58) Field of Classification Search
USPC ................................ 219/69.12, 69.13, 69.18
See application file for complete search history.

(56) References Cited

U.S. PATENT DOCUMENTS

| | | | | |
|---|---|---|---|---|
| 3,627,966 A | * | 12/1971 | van Osenbruggen et al. | 219/69.13 |
| 5,572,003 A | * | 11/1996 | Kaneko | 219/69.13 |
| 5,770,831 A | * | 6/1998 | Kaneko et al. | 219/69.18 |
| 6,140,600 A | * | 10/2000 | Kaneko et al. | 219/69.13 |
| 7,119,300 B2 | * | 10/2006 | Liang et al. | 219/69.12 |
| 7,582,842 B2 | * | 9/2009 | D'Amario | 219/69.13 |

FOREIGN PATENT DOCUMENTS

| | | | |
|---|---|---|---|
| JP | 62-015017 | * | 1/1987 |
| JP | 62-015017 A | | 1/1987 |
| JP | 01-097525 A | | 4/1989 |
| JP | 07-276142 A | | 10/1995 |

* cited by examiner

*Primary Examiner* — Henry Yuen
*Assistant Examiner* — Thomas Ward
(74) *Attorney, Agent, or Firm* — Sughrue Mion, PLLC

(57) ABSTRACT

In a wire electrical discharge machining apparatus, an upper main-discharge power supply is connected between an upper conducting terminal and a workpiece using an upper main-feeder line capable of configuring outward and homeward paths, and a lower main-discharge power supply is connected between a lower conducting terminal and the workpiece using a lower main-feeder line capable of configuring outward and homeward paths. Moreover, a sub-discharge power supply is connected between the upper conducting terminal and the workpiece and between the lower conducting terminal and the workpiece using an upper and a lower sub-feeder lines that have higher impedances than the impedances of the upper and the lower main-feeder lines and can configure outward and homeward paths.

17 Claims, 8 Drawing Sheets

WIRE ELECTRICAL DISCHARGE MACHINING APPARATUS

TECHNICAL FIELD

The present invention relates to a wire electrical discharge machining apparatus, more particularly to a configuration method for a machining power supply.

BACKGROUND ART

In a wire electrical discharge machining apparatus, a wire as one electrode is running in an up-down direction and is arranged to be opposed to a workpiece as the other electrode that is controlled to move on a plane perpendicular to the wire running direction. A pulse discharge is caused in a machining gap between the wire and the workpiece (i.e., inter-electrode gap), and the workpiece is machined into a desired shape by utilizing heat energy generated due to the discharge.

In the wire electrical discharge machining apparatus, in a configuration for supplying power to the inter-electrode gap, the workpiece is directly connected to one electrode end of a machining power supply and the running wire is connected to the other electrode of the machining power supply through a feeding point on which the wire is slidable. Generally, two feeding points are provided; one above and the other below the workpiece. In other words, there are two circuits in parallel on upper and lower sides of the workpiece as paths for a discharge current flowing in the wire.

FIG. 6 depicts a configuration of a wire electrical discharge machining apparatus disclosed in Patent Document 1. The conventional wire electrical discharge machining apparatus generally employs, for example, as shown in FIG. 6, two machining power supplies consisting of a sub-discharge power supply for inducing spark discharge (pre-discharge) of small current and a main-discharge power supply for supplying large current as a machining current after generation of the spark discharge to perform rough machining and finish machining.

As shown in FIG. 6, an auxiliary power supply VS, which is a sub-discharge power supply, is connected to an inter-electrode gap (E-W) through a switching transistor Tr1, a coaxial cable W1 as a power supply line, and a resistor R1; and a main power supply VN, which is a main-discharge power supply, is connected to the inter-electrode gap (E-W) through a switching transistor Tr2, a resistor R2, diode D1, a coaxial cable W2 as a power supply line, and an electromagnetic switch K. Generation of discharge in the inter-electrode gap (E-W) is detected in a discharge detecting unit 61, and a pulse controlling unit 62 that receives the detected signal controls on-off operations of the transistors Tr1 and Tr2.

When rough machining is to be performed, the electromagnetic switch K is kept at the closed-circuit state, and the transistor Tr1 is turned on to supply a voltage of the auxiliary power supply VS to the inter-electrode gap (E-W) to generate discharge. After discharge is generated at the inter-electrode gap (E-W), the transistor Tr2 is turned on to supply a voltage of the main power supply VN to the inter-electrode gap (E-W), and rough machining is performed. When fine machining is to be performed, the electromagnetic switch K is turned to the open-circuit state to electrically separate the main power supply VN, and fine machining is performed using only the auxiliary power supply VS.

One of the problems in the wire electrical discharge machining apparatus is how to speed up rough machining. To speed up rough machining, input energy for rough machining has only to be increased, but this leads to wire breakage. The cause of the wire breakage is mainly "concentrated discharge" that discharge is concentrated at one point.

Accordingly, technologies have been conventionally proposed for preventing wire breakage by avoiding the concentrated discharge using a fact that current paths of discharge current exist in parallel at upper and lower sides, as described above (for example, Patent Documents 2 and 3).

Specifically, a technology is disclosed in Patent Document 2 in which by focusing attention on a viewpoint that a difference of currents (current division ratio) supplied from two points, upper and lower, to a discharge position on the wire, which is a resistor, depends on the ratio of the wire lengths to the discharge position, that is, the ratio in accordance with the resistances of wires, current sensors are provided at a feeding point at upper side and a feeding point at lower side, respectively, and the difference of currents output from the two current sensors in accordance with the difference of resistances is detected to measure the discharge position and to stop applying voltage to the inter-electrode gap when the discharge is concentrating.

FIG. 7 shows a configuration of the wire electrical discharge machining apparatus disclosed in Patent Document 3. In Patent Document 3, as shown in FIG. 7, by providing switching elements 71a and 71b capable of controlling independently from each other machining currents supplied from two upper and lower positions, respectively to a wire electrode 70, a technology is disclosed for preventing discharge concentration by making a configuration to supply machining currents asynchronously in the upper and lower sides. With this technology, concentration of currents on one point can be prevented, thereby enabling to prevent wire breakage.

The configuration shown in FIG. 7 is roughly explained. As shown in FIG. 7, the wire electrode 70 runs from upward to downward guided by wire guides 73a and 73b which are arranged in the up-down direction with an appropriate interval therebetween. In a wire running path between these wire guides 73a and 73b, a workpiece 74 is arranged opposed to the wire electrode 70 with a predetermined gap therebetween, and machining liquid nozzles 75a and 75b are provided at positions that sandwich the workpiece 74 from close distances in the up-down direction. These nozzles are provided to remove machining swarf by jetting high-pressure machining liquid to the positions opposed to the workpiece 74 of the wire electrode 70 from the upper and lower sides.

An upper feeding point (conducting terminal) 76a and a lower feeding point (conducting terminal) 76b are provided in sliding contact with the wire electrode 70 at a position near the wire guide 73a and at a position near the wire guide 73b, respectively. Serial-connection-side electrode ends of machining power supplies 77a and 77b arranged in series are directly connected to the workpiece 74. One electrode terminal in the serial circuit of the machining power supplies 77a and 77b is connected to the conducting terminal 76a through a resistor 78a, a switching element 71a, and a diode 79a, and the other electrode terminal in the serial circuit of the machining power supplies 77a and 77b is connected to the conducting terminal 76b through a resistor 78b, a switching element 71b, and a diode 79b. On-off controls of the switching elements 71a and 71b are independently performed by gate-pulse generation circuits 80a and 80b, respectively.

Meanwhile, in wire electrical discharge machining apparatuses, once the discharge is finished, the wire enters in a state with a reaction force received in the opposite direction against the discharge direction. In addition, to remove machining swarf, as described above, jetting high-pressure machining liquids from upper and lower positions that sandwich the workpiece towards the opposed positions is a general practice. However, with the reaction force, machining-liquid jetting, and other effects, the wire vibrates and the straightness accuracy of the workpiece becomes liable to degrade, causing an error in a machining shape. More specifically, another problem of the wire electrical discharge machining apparatus is how to correct the error in the machining shape caused by wire vibration.

To reduce the error in the machining shape caused by wire vibration, one approach is to select parameters such as machining energy, machining speed, wire tension, machining fluid pressure at optimum values for each machining process; however, in the present invention, by focusing attention on the power supply configuration shown in Patent Document 3 (FIG. 7), controlling the machining energy at an optimum value is considered.

Specifically, in the typical power supply configuration shown in FIG. 6, the present invention configures the main power supply VN with two machining power supplies 77a and 77b shown in FIG. 7, and does not connect these power supplies in serial but separates these power supplies into the main power supply for upper-side feeding and the main power supply for lower-side feeding so as to enable to control these power supplies independently. More specifically, the present invention enables to feed the inter-electrode gap independently from each of the upper and lower main power supplies even to make it possible to feed one side from a feeding point of the one side.

In addition, a configuration that also allows a measurement of discharge position as necessary is considered. In this case, because the measurement of discharge position utilizes the current division ratio, as described above (Patent Document 2), when two main-discharge power supplies are used for the measurement of discharge position, the discharge position cannot be measured because the current division ratio cannot be obtained when only one-side main-discharge power supply is used. Therefore, the measurement of discharge position is performed by adopting a configuration to use a sub-discharge power supply. In other words, in order to enable the measurement of discharge position, it is necessary to adopt a configuration to perform feeding from the sub-discharge power supply to the inter-electrode gap using a similar method as the two main-discharge power supplies, as described above, from two upper and lower feeding points. This measure is necessary to prevent useless discharge by stabilizing sub discharge (pre-discharge), which is a spark discharge.

The connections between each one of such two main-discharge power supplies and the inter-electrode gap, and between a sub-discharge power supply and the inter-electrode gap become, for example, as shown in FIG. 8. FIG. 8 is a circuit diagram of an example of configuration for the connections between each one of the two main-discharge power supplies and the inter-electrode gap, and between the sub-discharge power supply and the inter-electrode gap using a conventional technology when configuring a wire discharge machining apparatus to enable the measurement of the discharge position by using the two independent main discharge power supplies for an upper-side feeding and an lower-side feeding, and by using the sub-discharge power supply.

As shown in FIG. 8, the wire discharge machining apparatus aimed by the present invention includes a main-discharge power supply 85a for upper-side feeding and a main-discharge power supply 85b for lower-side feeding that can be controlled independently with each other and a sub-discharge power supply 86 as a machining power supply for the discharge machining unit shown in FIG. 7 (the wire electrode 70, the workpiece 74, the upper and lower-side feeding points (conducting terminals) 76a and 76b, and the upper and lower wire guides 73a and 73b; meanwhile, the machining liquid nozzles 75a and 75b are abbreviated in the figure). An upper terminal block 87a and a lower terminal block 87b are provided to connect between each one of the two main-discharge power supplies 85a and 85b and the inter-electrode gap, and between the sub-discharge power supply 86 and the inter-electrode gap as described below.

More specifically, at the upper terminal block 87a, its wire electrode connection end E is connected to the upper feeding point (conducting terminal) 76a, on the other hand, one electrode end of the main-discharge power supply 85a and one electrode end of the sub-discharge power supply 86 are each connected to this wire electrode connection end E. On the other hand, at the lower terminal block 87b, its wire electrode connection end E is connected to the lower feeding point (conducting terminal) 76b, on the other hand, one electrode end of the main-discharge power supply 85b and one electrode end of the sub-discharge power supply 86 are each connected to this wire electrode connection end E. A workpiece connection end W of the upper terminal block 87a and a workpiece connection end W of the lower terminal block 87b are each connected to the workpiece 74, on the other hand, each the other electrode end of the main-discharge power supplies 85a and 85b and the other electrode end of the sub-discharge power supply 86 are each connected to each workpiece connection end W of both terminal blocks.

If each one of the two main-discharge power supplies 85a and 85b and the inter-electrode gap, and the sub-discharge power supply 86 and the inter-electrode gap are connected as described above, during one-side feeding using one main-discharge power supply, feeding from the sub-discharge power supply 86 to the inter-electrode gap can be performed from two upper and lower points of the wire electrode 70, so although a current sensor is not shown in FIG. 8, if current sensors are provided at the two upper and lower points of the wire electrode 70, the measurement of discharge position using sub discharge current becomes possible.

Patent Document 1: Japanese Patent Application Laid-open No. H7-276142 (FIG. 5)

Patent Document 1: Japanese Patent Application Laid-open No. S61-15017 (FIG. 1)

Patent Document 3: Japanese Patent Application Laid-open No. H1-97525 (FIG. 2)

DISCLOSURE OF INVENTION

Problem to be Solved by the Invention

However, if connections between each one of the two main-discharge power supplies and the inter-electrode gap, and between the sub-discharge power supply and the inter-electrode gap are configured as shown in FIG. 8, there is a problem that independence between upper-side feeding and lower-side feeding that should be controlled independently is lost.

In other words, in FIG. 8, as an aspect of the power-supply control for one-side feeding, for example, when the main-discharge power supply 85a for upper-side feeding is turned on and the main-discharge power supply 85b for lower-side feeding is turned off, discharge current by the main-discharge power supply 85a flows into the inter-electrode gap through the path of the wire electrode connection end E of the upper terminal block 87a—the upper feeding point (conducting terminal) 76a—the wire electrode 70—the workpiece 74—the workpiece connection end W of the upper terminal block 87*a*. This is the current path during the upper-side feeding.

However, the discharge current by the main-discharge power supply 85*a* not only flows through the path described above, but also flows at the same time, as shown with a dotted line, into the inter-electrode gap through the path of the wire electrode connection end E of the upper terminal block 87*a*—one electrode end of the sub-discharge power supply 86—the wire electrode connection end E of the lower terminal block 87*b*—the lower feeding point (conducting terminal) 76*b*—the wire electrode 70—the workpiece 74—the workpiece connection end W of the upper terminal block 87*a* in the direction opposite to the direction described above. These are the current paths during the upper-side feeding.

In this way, in the configuration shown in FIG. 8, because a current path through one electrode end of the sub-discharge power supply flowing into the other feeding point is formed, as described above, the main-discharge current supplied to the inter-electrode gap from one feeding point is supplied also to the inter-electrode gap from the other feeding point, independence between the upper-side feeding and lower-side feeding is lost.

The present invention has been achieved in view of the above discussion, and it is an object of the present invention to provide a wire electrical discharge machining apparatus that, when providing upper-side feeding and lower-side feeding power independently as the main-discharge power supplies, can supply current evenly from the upper and lower feeding points to the inter-electrode gap during the sub discharge by the sub-discharge power supply while maintaining the independence between upper-side feeding and lower-side feeding.

Also, in the invention described above, another object of the present invention is to provide a wire electrical discharge machining apparatus that can measure discharging position by monitoring currents supplied from the upper and lower feeding points into the inter-electrode gap during sub discharge by the sub-discharge power supply.

Means for Solving Problem

To achieve the above objects, the present invention provides a wire electrical discharge machining apparatus, in which an upper and a lower conducting terminals are arranged in sliding contact with a wire electrode that runs in an up-down direction at least one point of upper position and at least one point of lower position of the wire electrode, respectively, and a workpiece is arranged to be opposed to the wire electrode between the upper and the lower conducting terminals having a predetermined machining gap between the wire electrode and the workpiece, includes a machining power supply for supplying a discharge current between the wire electrode and the workpiece by applying a discharge voltage to the upper and the lower conducting terminals and the workpiece, wherein the machining power supply includes a first and a second main discharge power supplies that generate main discharge voltages independently with each other, and a sub-discharge power supply that generates a sub discharge voltage different from the main discharge voltages, and the first main discharge power supply is connected between the upper conducting terminal and the workpiece using a first connection line capable to configure a round-trip path, the second main discharge power supply is connected between the lower conducting terminal and the workpiece using a second connection line capable to configure a round-trip path, and the sub-discharge power supply is connected between the upper conducting terminal and the workpiece, and between the lower conducting terminal and the workpiece, respectively using a third and a fourth connection lines that have higher impedances than the impedances of the first and the second connection lines and are capable to configure round-trip paths.

According to the present invention, just like the independently provided first and second main-discharge power supplies, current loops are independently provided between the sub-discharge power supply and the upper and lower conducting terminals, respectively; but because the two current loops provided in this sub-discharge power-supply side are set to high impedances, respectively, at the time of the one-side feeding when the main-discharge voltage is applied between one of the upper and lower terminals and the workpiece, the main-discharge current can be prevented from flowing from one conducting terminal to the other conducting terminal side through the sub-discharge power supply side, thereby enabling to ensure the independence between the upper-side feeding and the lower-side feeding. In addition, even if there is an impedance difference caused by a circuit structure between two current loops, because during sub discharge (pre-discharge), it is possible to take a measure to evenly supply currents from the sub-discharge power supply to the upper and lower terminals, a useless discharge can be prevented, thereby enabling to induce a stable sub discharge (pre-discharge).

Effect of the Invention

According to the present invention, while inducing sub discharge (pre-discharge) using a sub-discharge power supply, machining energy can be controlled in the thickness direction of a workpiece by adjusting the output of two independent main-discharge power supplies such as performing one-side feeding according to the machining situation to correct an error in the machining shape caused by wire vibration.

Figure 1:
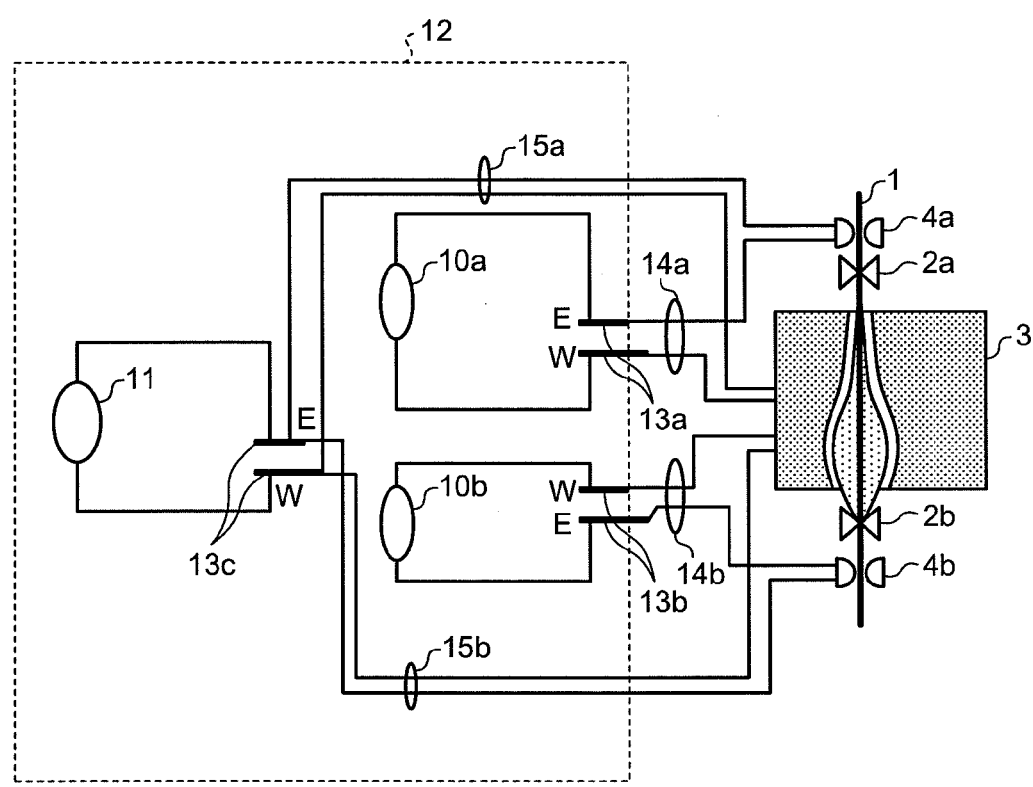
FIG. 1 is a schematic diagram illustrating a configuration of a power supply of a wire electrical discharge machining apparatus according to a first embodiment of the present invention.

EXPLANATIONS OF LETTERS OR NUMERALS 1 wire electrode
2a, 2b wire guide
3 workpiece
4a upper feeding point (upper conducting terminal)
4b lower feeding point (lower conducting terminal)
10a main-discharge power supply for upper-side feeding (upper main-discharge power supply)
10b main-discharge power supply for lower-side feeding (lower main-discharge power supply)
11 sub-discharge power supply
12 power-supply box
13a upper terminal block
13b lower terminal block
13c sub terminal block
14a upper main-feeder line
14b lower main-feeder line
15a upper sub-feeder line
15b lower sub-feeder line
21a, 21b current sensor
22a, 22b auxiliary capacitor
30a, 30b sub terminal block
31a, 31b resistor element (current limiting element)
41a, 41b single electrode line
42 low impedance material (for example, copper plate)

BEST MODE(S) FOR CARRYING OUT THE INVENTION

Exemplary embodiments of a wire electrical discharge machining apparatus according to the present invention will be explained below in detail with reference to the accompanying drawings.

First Embodiment

FIG. 1 is a schematic diagram illustrating a configuration of a power supply of a wire electrical discharge machining apparatus according to a first embodiment of the present invention. In FIG. 1, reference numeral 1 denotes a wire electrode. The wire electrode 1 runs, for example from upward to downward, while being guided by wire guides 2a and 2b arranged in an up-down direction with an appropriate interval therebetween. A plate-shaped workpiece 3 having a certain thickness is arranged on a plane perpendicular to a wire running direction to be opposed to a wire running path between the upper and lower side wire guides 2a and 2b with a predetermined machining gap (hereinafter, "inter-electrode gap"). An upper conducting terminal 4a is provided at a position near the upper-side wire guide 2a and a lower conducting terminal 4b is provided at a position near the lower-side wire guide 2b. The upper and lower conducting terminals 4a and 4b are each in sliding contact with the wire electrode 1. In addition, although not shown in this figure, machining liquid nozzles are provided on the wire running path between the wire guides 2a and 2b at positions that sandwich the workpiece 3 from close distances in the up-down direction. These machining liquid nozzles jet high-pressure machining liquid into the opposing position to the workpiece 3 of the wire electrode 1 from upward and downward to remove machining swarf. What is described above is a general configuration of a discharge machining unit.

In this first embodiment and even in each embodiment shown later, the upper and lower conducting terminals 4a and 4b show each only one terminal, but the present invention includes situations when a plurality of terminals are provided in both or one of the upper and lower conducting terminals 4a and 4b. In other words, in the present invention, at least one terminal needs to be provided in each of the upper and lower conducting terminals 4a and 4b.

As a machining power supply for this discharge machining unit, the present embodiment includes a main-discharge power supply (upper main-discharge power supply) 10a for upper-side feeding and a main-discharge power supply (lower main-discharge power supply) 10b for lower-side feeding that are mutually independently controllable, and a sub-discharge power supply 11. The sub-discharge power supply 11 mainly generates a voltage pulse of relatively low voltage for supplying a sub discharge voltage to an inter-electrode gap for detecting a state of the machining gap (inter-electrode gap) between the wire electrode 1 and the workpiece 3. On the other hand, each of the upper main-discharge power supply 10a and the lower main-discharge power supply 10b mainly generates a voltage pulse of a predetermined pulse width at a predetermined level higher than the sub-discharge power supply 11 for supplying a main-discharge current for machining to the inter-electrode gap.

These three power supplies are housed, for example, in a power supply box 12, and an upper terminal block 13a to which both electrode ends of the upper main-discharge power supply 10a are to be connected, a lower terminal block 13b to which both electrode ends of the lower main-discharge power supply 10b are to be connected, and a sub terminal block 13c to which both electrode ends of the sub-discharge power supply 11 are to be connected are provided in this power supply box 12 as output terminals. To connect between these three terminal blocks and inter-electrode gap, four feeder lines (upper and lower main-feeder lines 14a and 14b, and upper and lower sub-feeder lines 15a and 15b) that can configure outward and homeward paths are used. In addition, the upper and lower main-feeder lines 14a and 14b correspond to first and second connection lines, respectively, and the upper and lower sub-feeder lines 15a and 15b correspond to third and fourth connection lines, respectively.

In a connection between the upper terminal block 13a and the inter-electrode gap, an electric cable that becomes an outward path of the upper main-feeder line 14a is used to connect between the wire electrode connection end E and the upper conducting terminal 4a, and an electric cable that becomes a homeward path of the upper main-feeder line 14a is used to connect between the workpiece connection end W and the workpiece 3. Also, in a connection between the lower terminal block 13b and the inter-electrode gap, an electric cable that becomes an outward path of the lower main-feeder line 14b is used to connect the wire electrode connection end E and the lower conducting terminal 4b, and an electric cable that becomes a homeward path of the lower main-feeder line 14b is used to connect the workpiece connection end W and the workpiece 3.

On the other hand, in a connection between the sub terminal block 13c and the inter-electrode gap, an electric cable that becomes an outward path of the upper sub-feeder line 15a is used to connect between the wire electrode connection end E and the upper conducting terminal 4a, and an electric cable that becomes an homeward path of the upper sub-feeder line 15a is used to connect between the workpiece connection end W and the workpiece 3. Similarly, an electric cable that becomes an outward path of the lower sub-feeder line 15b is used to connect between The wire electrode connection end E and the lower conducting terminal 4b, and an electric cable that becomes a homeward path of the lower sub-feeder line 15b is used to connect between the workpiece connection end W and the workpiece 3.

Next, the upper and lower main-feeder lines 14a and 14b, and the upper and lower sub-feeder lines 15a and 15b will be explained more specifically. Basically, the upper and lower main-feeder lines 14a and 14b use, for example, low impedance coaxial cables. Depending on the current value at rough machining, the number of the coaxial cables is increased in parallel to reduce the impedance.

On the other hand, the upper and lower sub-feeder lines 15a and 15b are made high impedance by using, for example, a twist pair cable having higher impedance than a coaxial cable. The reason for this is that the purpose of the sub-discharge power supply 11 is to induce sub discharge, which is a spark discharge (pre-discharge), by applying a voltage pulse to the inter-electrode gap, the sub-feeder lines 15a and 15b need not to be low impedance.

With such a configuration, as an aspect of a power supply control of one-side feeding, for example, when the upper main-discharge power supply 10a is turned on and the lower main-discharge power supply 10b is turned off, discharge current by the upper main-discharge power supply 10a flows into the inter-electrode gap between the wire electrode 1 and the workpiece 3 from the upper conducting terminal 4a through the upper terminal block 13a and the upper main-feeder line 14a.

At this time, the discharge current by the upper main-discharge power supply 10a flows also into the path of the upper conducting terminal 4a—the upper sub-feeder line 15a—the sub terminal block 13c—the lower sub-feeder line 15b—the lower conducting terminal 4b; however, because the upper and lower sub-feeder lines 15a and 15b have high impedance, the currents flowing into this path are blocked by the upper and lower sub-feeder lines 15a and 15b, and actually not supplied to the inter-electrode gap from the lower conducting terminal 4b.

As described above, even if the machining power supply is configured so that the sub discharge current can be supplied to the inter-electrode gap through both upper and lower conducting terminals 4a and 4b, because during one-side feeding using one conducting terminal, the current flowing into the other conducting terminal through the sub-discharge power supply 11 side can be blocked, the independence of the one-side feeding can be ensured.

On the other hand, as for the upper and lower sub-feeder lines 15a and 15b, when the upper and lower conducting terminals 4a and 4b are each one, by appropriately determining the relationship of both impedances, or when the upper and lower conducting terminals 4a and 4b exist one or more and can be selected, by connecting the upper and lower sub-feeder lines 15a and 15b to the selected appropriate conducting terminals, even if discharge occurs at any position in the thickness direction of the workpiece, the sub discharge current can be evenly supplied to the inter-electrode gap from the upper and lower conducting terminals 4a and 4b, while keeping the independence of the one-side feeding.

In other words, in order to flow the sub discharge current evenly without a bias to the inter-electrode gap from the upper and lower conducting terminals 4a and 4b, basically, the upper and lower sub-feeder lines 15a and 15b need to be made with the same material, have the same cable shape and configuration. However, because the sub-discharge current flows through a circuit structure including the upper and lower conducting terminals 4a and 4b and the workpiece 3, it is considered that a bias in the sub discharge current might essentially occur depending on a machining state.

As an example, when the machining state changes, for example, to a state in which the impedance of a current loop passing one conducting terminal becomes larger than the impedance of a current loop passing the other conducting terminal, because the sub discharge current supplied from one conducting terminal becomes extremely low, "useless discharge" in which sub discharge does not lead to main discharge occurs, and machining characteristics might be degraded.

In this situation, each impedance of the upper and lower sub-feeder lines 15a and 15b is determined so that the sub discharge current when the sub discharged is occurred near the thickness center of the workpiece 3 is nearly evenly balanced between a upper feeding loop and a lower feeding loop. When the upper and lower conducting terminals 4a and 4b are one, respectively, this can be realized by using different materials, line shapes, and configurations for upper and lower sub-feeder lines 15a and 15b in accordance with the machining state. Also, when the upper and lower conducting terminals 4a and 4b are more than one and selectable, respectively, this can be realized by selecting and connecting appropriate conducting terminals for upper and lower sub-feeder lines 15a and 15b in accordance with the machining state.

Specifically, as for the case where the upper and lower conducting terminals 4a and 4b are one, respectively, if a high impedance sub-feeder line (for example, one set of twist pair line) is used to connect to either one conducting terminal that the circuit structure becomes low impedance, and a low impedance sub-feeder line (for example, two or three sets of twist pair lines) is used to connect to either the other conducting terminal that the circuit structure becomes high impedance, the sub discharge current can be made to flow evenly.

If a concrete numerical example of the current ratio "upper feeding loop/lower feeding loop" between the upper feeding loop and the lower feeding loop to which such a measure is applied is to be explained, the current ratio becomes 1/10< (upper feeding loop/lower feeding loop)<10, or more preferably, 1/2<(upper feeding loop/lower feeding loop)<2. As described above, if the sub discharge current is evenly supplied from the upper and lower sides, because the frequency of occurrence of "useless discharge" decreases, stable machining characteristics without depending on the discharge position can be obtained.

In addition, there are two components: inductance component and resistance component, which manifest impedance. The difference between a coaxial cable and a twist pair line is mainly the difference of inductance components, but it is allowed to be the difference of resistance components. For example, when a coaxial cable is used for the sub-feeder line, it is possible to make the sub-feeder line high impedance by making the cross-sectional area of a coaxial cable used in the main-feeder line smaller, or by making the length of the coaxial cable longer.

Moreover, as is understandable from the explanation of operation described above, because the impedance of the sub-feeder line has only to be high at least during the time period while the main-discharge current is flowing, it is also possible to configure the power supply so as to separate off the sub-feeder line, for example, using a mechanical switch such as an electric switch like an FET and a mechanical switch like a relay while the main-discharge current is being applied. On this occasion, because the impedance of the sub-feeder line becomes momentarily infinite, if this is explained similarly in the example of operation as described above, it is possible to make the current output from the upper main-discharge power supply 10a do not be supplied from the lower conducting terminal 4b. This is a configuration example of "the means for making the sub-feeder line high impedance."

In addition, although FIG. 1 shows as if the upper and lower main-feeder lines 14a and 14b cannot be separated off from the upper and lower conducting terminals 4a and 4b, of course as disclosed in Patent Document 1, they may be separated off by inserting an electromagnetic switch such as a conductor and a relay. If doing so, by separating off the upper and lower main-feeder lines 14a and 14b used at rough machining when performing fine machining, an excessive current due to stray capacitance does not flow into the inter-electrode gap, thereby enabling to enhance the finish surface accuracy.

As described above, according to the first embodiment, when providing a power supply for upper-side feeding and a power supply for lower-side feeding independently as the main-discharge power supplies, and enabling to feed from both upper and lower sides using also the sub-discharge power supply, because the main discharge current supplied from one conducting terminal does not flow into the inter-electrode gap from the other conducting terminal through the electrode edge of the sub-discharge power supply, independence between upper-side and lower-side feedings can be maintained.

In addition, when the sub discharge current using the sub-discharge power supply is supplied from the upper and lower conducting terminals, even if discharge occurs at any position in the thickness direction of the workpiece, uniform sub discharge current can be supplied, so it is possible to lead to main discharge by inducing a stable sub discharge, thereby enabling to perform stable machining without depending on the discharge position.

With these measures, it is possible to control the machining energy in the thickness direction of the workpiece by adjusting each output of the upper and lower main-discharge power supplies, such as performing one-side feeding in accordance with the machining situation while inducing a stable sub discharge, thereby enabling to correct the error in machining shape caused by wire vibration.

Second Embodiment

Figure 2:
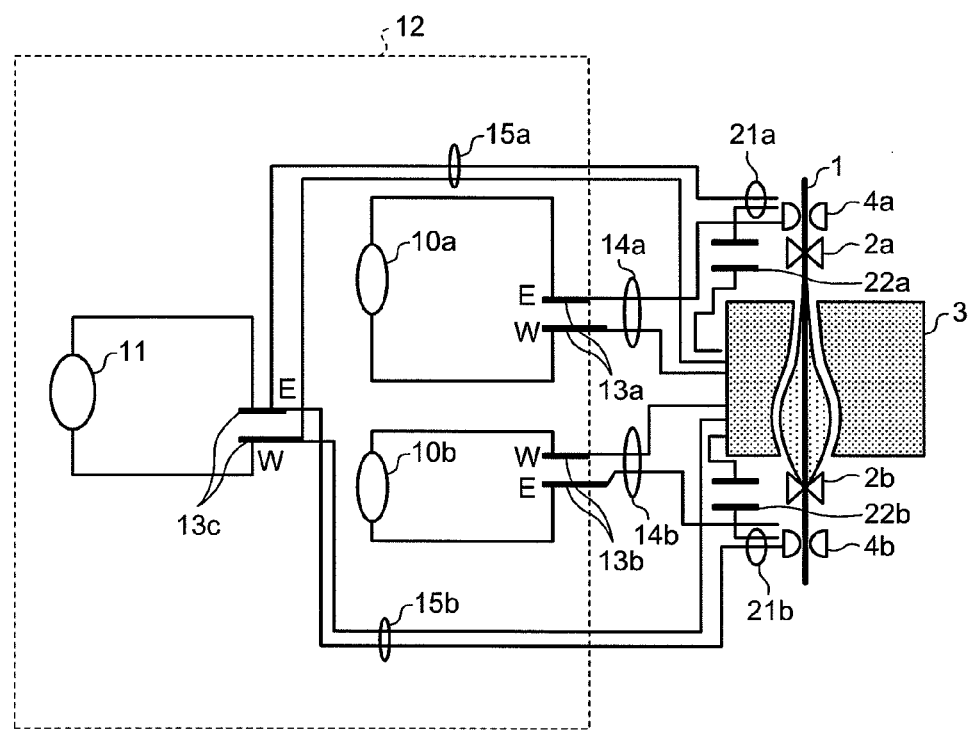
FIG. 2 is a schematic diagram illustrating a configuration of a power supply of a wire electrical discharge machining apparatus according to a second embodiment of the present invention.

FIG. 2 is a schematic diagram illustrating a configuration of a power supply of a wire electrical discharge machining apparatus according to a second embodiment of the present invention. In FIG. 2, the components that are the same or similar to those shown in FIG. 1 (first embodiment) are denoted by the same reference numeral. The components related to the second embodiment are mainly explained below.

As shown in FIG. 2, in this second embodiment, a current sensor 21a is mounted, for example, on an outward path of the upper sub-feeder line 15a, and a current sensor 21b is mounted, for example, on an outward path of the lower sub-feeder line 15b in the configuration shown in FIG. 1 (first embodiment). Moreover, an auxiliary capacitor 22a is inserted between the upper conducting terminal 4a and the workpiece 3, and an auxiliary capacitor 22b is inserted between the lower conducting terminal 4b and the workpiece 3.

The current sensors 21a and 21b are provided to measure a discharge position from a current division ratio of sub discharge current. Because the sub discharge current flowing from the sub-discharge power supply 11 into the upper and lower conducting terminals 4a and 4b is also affected by wire impedance, as in a main discharge current, it is possible to detect a discharge position using the wire impedance, as in the case using the main discharge current shown in Patent Document 2.

In addition, the auxiliary capacitors 22a and 22b are charged up by receiving a voltage pulse that the sub-discharge power supply 11 outputs when discharge does not occur at an inter-electrode gap, and when sub discharge occurs, the charged electric charge is injected in the inter-electrode gap as the sub discharge current to perform an action to reinforce the sub discharge current. With this, occurrence of useless discharge can be prevented. Therefore, in such a case where the occurrence of useless discharge is few or not anticipated, it is said that there is no need to provide, in particular, the auxiliary capacitors 22a and 22b.

From the purport describe above, basically, these auxiliary capacitors 22a and 22b have only to be provided between the respective lines of the upper and lower sub-feeder lines 15a and 15b. In other words, it is allowable to arrange these auxiliary capacitors 22a and 22b near the sub-discharge power supply 11 and the sub terminal block 13c. However, it is preferable that just after the sub discharge, the current can be injected from the auxiliary capacitors 22a and 22b to the inter-electrode gap. Therefore, as shown in FIG. 2, in order to decrease the inductance of the line from the auxiliary capacitors 22a and 22b to the inter-electrode gap as small as possible, they are arranged between the upper and lower conduction terminals 4a and 4b arranged as close as possible and the workpiece 3, respectively.

The current sensors 21a and 21b are mounted so that each outward path of the upper and lower sub-feeder lines 15a and 15b, and each connection line between the auxiliary capacitors 22a and 22b and the upper and lower conduction terminals 4a and 4b are included. By doing so, because the current flowing during the sub discharge is a combination of current output from the sub-discharge power supply 11 and current output from the auxiliary capacitors 22a and 22b, detection current intensity is increased for the current sensors 21a and 21b, thereby enabling to perform discharge position detection with a high SN ratio. However, if the phase of the output current of the sub-discharge power supply 11 does not match with the phases of the output currents of the auxiliary capacitors 22a and 22b due to the effects such as a stray inductance, it only needs to detect the discharge position using either one current division ratio.

As described above, according to the second embodiment, by providing the current sensors to detect the respective sub discharge current flowing from the sub-discharge power supply to the upper and lower conducting terminals, the discharge position detection can be performed using the sub discharge current to supply from both upper and lower side to the inter-electrode gap while maintaining independence between the upper-side feeding and the lower-side feeding described in the first embodiment, thereby enabling a power supply control in accordance with the discharge position.

Moreover, by providing the auxiliary capacitors to reinforce the sub discharge currents to supply from both upper and lower conducting terminals to the inter-electrode gap, respectively, occurrence of useless discharge can be prevented, enabling to perform a stable machining. Furthermore, because two auxiliary capacitors are provided, respectively near the inter-electrode gap to make low impedance, and a measure can be taken so as to perform the current injection from both upper and lower sides to the inter-electrode gap immediately just after starting sub discharge, the occurrence of useless discharge can be prevented more certainly.

Furthermore, when the two current sensors are used in combination with the two auxiliary capacitors, the two auxiliary capacitors are arranged respectively near the inter-electrode gap to make low impedance, and because a measure can be taken so that the two current sensors can detect the combination of the current flowing through the upper and lower feeder lines and the current output from the two auxiliary capacitors, a discharge position detection with a high SN ratio can be performed, thereby enabling to enhance the accuracy of the power supply control in accordance with the discharge position and accomplish a more stable machining.

Third Embodiment

Figure 3:
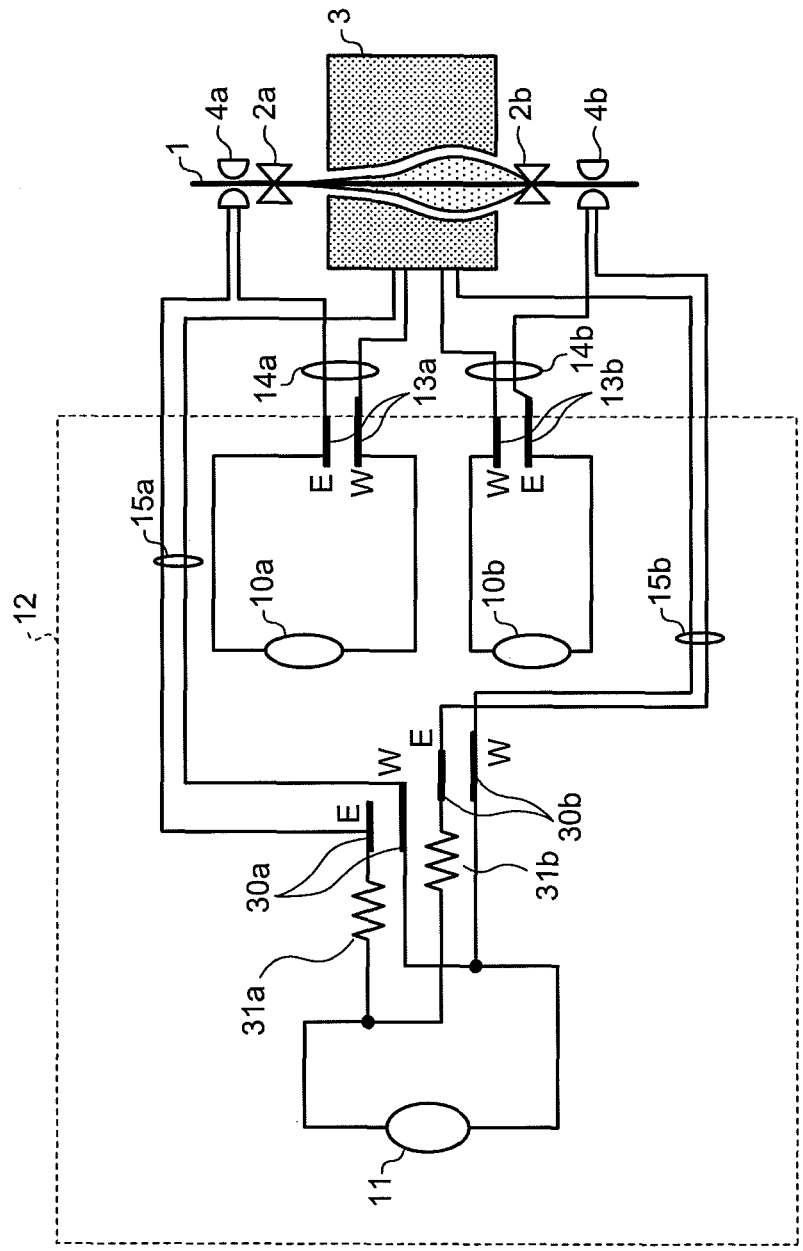
FIG. 3 is a schematic diagram illustrating a configuration of a power supply of a wire electrical discharge machining apparatus according to a third embodiment of the present invention.

FIG. 3 is a schematic diagram illustrating a configuration of a power supply of a wire electrical discharge machining apparatus according to a third embodiment of the present invention. In FIG. 3, the components that are the same or similar to those shown in FIG. 1 (first embodiment) are denoted by the same reference numeral. The components related to the third embodiment are mainly explained below. In the third embodiment, a method for detecting discharge position without using a current sensor is explained.

As shown in FIG. 3, in the third embodiment, a sub terminal block 30a to which the upper sub-feeder line 15a is connected and a sub terminal block 30b to which the lower sub-feeder line 15b is connected are provided in place of the sub terminal block 13c in the configuration shown in FIG. 1 (first embodiment).

Furthermore, a wire electrode connection end E of the sub terminal block 30a and a wire electrode connection end E of the sub terminal block 30b are connected to one electrode end of the sub-discharge power supply 11 through a resistor element 31a and a resistor element 31b, respectively, and each workpiece connection end W of the sub terminal blocks 30a and 30b are connected to the other electrode end of the sub-discharge power supply 11 in common.

Because the resistor element 31a and the resistor element 31b are current limiting elements to limit current the current flowing from one electrode end of the sub-discharge power supply 11 to the upper conducting terminal 4a, and to limit the current flowing from one electrode end of the sub-discharge power supply 11 to the lower conducting terminal 4b, respectively, their locations are not limited by an aspect shown in FIG. 3, but they only exist within each current path from one electrode of the sub-discharge power supply 11 to the upper and lower conducting terminals 4a and 4b such as that they are inserted in each outward path of the upper and lower sub-feeder lines 15a and 15b.

With such a configuration, as an aspect of a power supply control of one-side feeding, for example, when the upper main-discharge power supply 10a is turned on and the lower main-discharge power supply 10b is turned off, discharge current by the upper main-discharge power supply 10a is supplied from the upper conducting terminal 4a to an inter-electrode gap between the wire electrode 1 and the workpiece 3 through the upper terminal block 13a and the upper main-feeder line 14a.

At this time, the discharge current by the upper main-discharge power supply 10a flows also into a path of the upper conducting terminal 4a—the upper sub-feeder line 15a—the sub terminal block 30a—the resistor element 31a—the resistor element 31b—the sub terminal block 30b—the lower sub-feeder line 15b—the lower conducting terminal 4b, but because the current flowing into this path is blocked by the amount of voltage drops at the resistor elements 31a and 31b, actually the current is not supplied from the lower conducting terminal 4b to the inter-electrode gap.

In the explanation of operation described above, impedances that the upper and lower sub-feeder lines 15a and 15b have were not taken into account, however, just as the first embodiment in which the upper and lower sub-feeder lines 15a and 15b have higher impedances than the impedances of the upper and lower main-feeder lines 14a and 14b, independence of one-side feeding can be ensured using the resistor elements 31a and 31b. In other words, although the upper and lower sub-feeder lines 15a and 15b used in this third embodiment are allowed to use a higher impedances wiring material than the impedances of the upper and lower main-feeder lines 14a and 14b, it is possible to use the same wiring material as that of the upper and lower main-feeder lines 14a and 14b. In the latter case, four feeder lines are allowed to use the same wiring material, thereby enabling to make power supply design easier.

As for a value of the resistor elements 31a and 31b, if the resistance value is too small, as is understandable from the explanation of operation described above, independence of one-side feeding breaks up. On the other hand, if the resistance value is too large, because the rise time of applied voltage pulse for sub discharge becomes slow more than necessary, there arise a problem that the discharge frequency drops. Therefore, for the value of the resistor elements 31a and 31b, any value, which if can block the current to flow in, is acceptable; but as a value within the range of not causing such a failure described above, for example, a resistance value of about $2\Omega$ to $6\Omega$ is preferable.

Furthermore, because current paths between the sub-discharge power supply 11 and the upper and lower conducting terminals 4a and 4b have the similar configuration as that of the first embodiment, even if discharge occurs at any position in the thickness direction of the workpiece 3, with the similar concept as the first embodiment, it becomes possible to evenly supply the sub discharge current from the upper and lower conducting terminals 4a and 4b to the inter-electrode gap while maintaining independence of one-side feeding.

In other words, when there is a difference between the impedance characteristics of a circuit structure including the upper conducting terminal 4a and the workpiece 3 and the impedance characteristics of a circuit structure including the lower conducting terminal 4b and the workpiece 3, if the upper and lower conducting terminals 4a and 4b are respectively one, by making the values of the resistor elements different from each other, and if the upper and lower conducting terminals 4a and 4b are respectively more than one and selectable, by taking a measure to select an appropriate conducting terminal to connect the upper and lower sub-feeder lines 15a and 15b, it is possible to evenly flow the sub discharge current without a bias from the upper and lower conducting terminals 4a and 4b to the inter-electrode gap.

For example, when the upper and lower conducting terminals 4a and 4b are respectively one, if the impedance characteristics of the circuit structure including the upper conducting terminal 4a and the workpiece 3 is extremely low compared with the impedance characteristics of the circuit structure including the lower conducting terminal 4b and the workpiece 3, it is possible to maintain impedance balance as a whole system by setting the resistor element 31a for limiting upper current to a high resistance value and setting the resistor element 31b for limiting lower current to a low resistance value. With this, a constant sub discharge current flows without depending on the discharge position, thereby enabling to prevent useless discharge and conduct a stable machining.

In addition, as current limiting elements, inductance elements that perform the same current limiting action are can be used in place of the resistor elements 31a and 31b. Also, by inserting a ferrite core in each outward path of the upper and lower sub-feeder lines 15a and 15b, a configuration to cut high-frequency components can be employed.

Next, a method for detecting a discharge position by using the resistor elements 31a and 31b is explained. As described above, when the discharge position changes in the thickness direction of the workpiece, the ratio of an upper current flowing into the upper conducting terminal 4a and a lower current flowing into the lower conducting terminal 4b changes. That is, currents flowing through the resistor element 31a for limiting the upper current and the resistor element 31b for limiting the lower current change respectively according to the discharge position. Therefore, to detect the discharge position simply, a ratio between the voltage drops of the sub discharge currents by the resistor elements 31a and 31b has only to be observed.

Specifically, for example, the discharge position can be measured by measuring voltage levels from the respective workpiece connection end W sides of the sub terminal block 30a and 30b to a wire-electrode connection end E side using an operational amplifier or other similar tools, and calculating the ratio of their voltage levels. Also, if a difference amplifier is connected between the wire connection end E side of the sub terminal block 30a and the wire connection end E side of the sub terminal block 30b, because a subtracted value between the upper current and the lower current can obtained from the difference amplifier, the discharge position can be easily detected.

In view of this discussion, in this third embodiment, because it is possible to decrease the number of feeder lines by curtailing the upper and lower sub-feeder lines 15a and 15b, such a modified example of the embodiment will be explained. Under the state in which upper and lower sub-feeder lines 15a and 15b are curtailed in FIG. 3, one electrode end of the sub-discharge power supply 11 is directly connected to each wire electrode connection end E side of the sub terminal blocks 30a and 30b, the wire electrode connection end E side of the sub terminal block 30a is connected to the wire electrode connection end E side of the upper terminal block 13a through the resistor element 31a; and similarly, the wire electrode connection end E side of the sub terminal block 30b is connected to the wire electrode connection end E side of the lower terminal block 13b through the resistor element 31b. And each workpiece connection end W of the sub terminal blocks 30a and 30b is connected to each workpiece connection end W of the upper and lower terminal blocks 13a and 13b.

With configuration of the modified example of the third embodiment, because the sub discharge current can be supplied from the upper and lower sides to the inter-electrode gap using the upper and lower main-feeder lines 14a and 14b, the similar effect of action can be obtained.

As described above, with the configuration of the modified example of the third embodiment, because a current limiting element is inserted in each current path from the sub-discharge power supply to the upper and lower conducting terminals, the discharge position can be detected by monitoring the limited current at each current limiting element without relying on the current sensor, and it is possible to control the current in accordance with the discharge position. In this way, it is possible to combine the current limiting element that meets the requirement of high impedance with a function of the current sensor, thereby enabling to make the simplification of system and the reduction of circuit size.

Furthermore, it is possible to make outward and homeward connection lines (feeder lines) used in both current paths from the sub-discharge power supply to the upper and lower conducting terminals have the same material and configuration as outward and homeward connection lines used in each current path from the two main-discharge power supplies to the upper and lower conducting terminals, thereby enabling to make the easiness of power-supply design.

In addition, even if the current paths from the sub-discharge power supply to the upper and lower conducting terminals are not provided, the sub discharge current can be supplied to the upper and lower conducting terminals using each current path from the two main-discharge power supply to the upper and lower conducting terminals by inserting the current limiting element between each current path from the two main-discharge power supply to the upper and lower conducting terminals, thereby enabling to reduce the number of outward and homeward connection lines.

Fourth Embodiment

Figure 4:
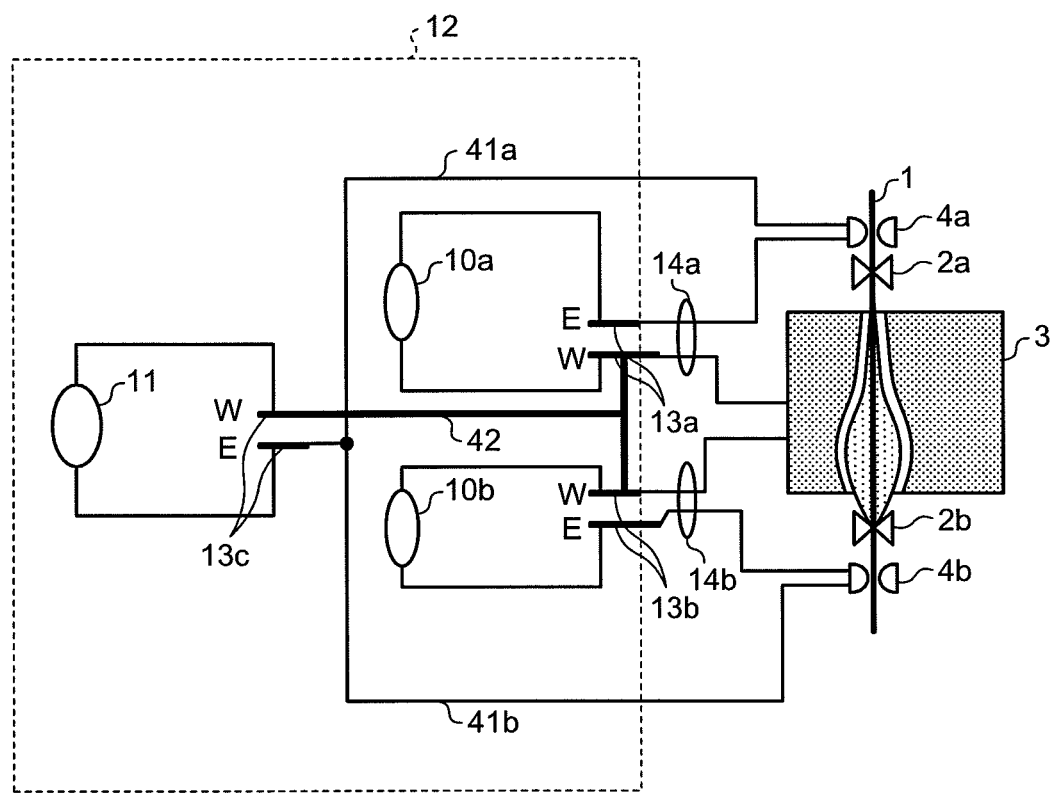
FIG. 4 is a schematic diagram illustrating a configuration of a power supply of a wire electrical discharge machining apparatus according to a fourth embodiment of the present invention.

FIG. 4 is a schematic diagram illustrating a configuration of a power supply of a wire electrical discharge machining apparatus according to a fourth embodiment of the present invention. In FIG. 4, the components that are the same or similar to those shown in FIG. 1 (first embodiment) are denoted by the same reference numeral. The components related to the fourth embodiment are mainly explained here.

As explained in the first embodiment, the sub-feeder lines 15a and 15b are preferable to have higher impedances than the impedances of the upper and lower main-feeder lines 14a and 14b, and made to include reactor components. Specifically, the sub-feeder lines 15a and 15b are determined to use twist pair lines. However, a current path that needs to be made high impedance is not a homeward path but an outward path.

Therefore, in this fourth embodiment, as shown in FIG. 4, in the configuration shown in FIG. 1 (first embodiment), in place of the upper and lower sub-feeder lines 15a and 15b, a single electrode line 41a of only outward path is connected between a wire electrode connection end E side of the sub terminal block 13c and the upper conducting terminal 4a, a single electrode line 41b of only homeward path is connected between the wire electrode connection end E side of the sub terminal block 13c and the lower conducting terminal 4b, and a workpiece connection end W of a sub terminal block 13 is connected to each workpiece connection end W of the upper and lower terminal blocks 13a and 13b using a low impedance material 42 such as a copper plate to include a homeward path using the upper and lower main-feeder lines 14a and 14b for a part of the homeward path.

With such a configuration, sub discharge current flows from the wire electrode connection end E side of the sub terminal block 13c to the single electrode line 41a (the single electrode line 41b), the upper conducting terminal 4a (the lower conducting terminal 4b), the wire electrode 1, and the workpiece 3, and furthermore, flows from the workpiece 3 to the upper and lower main-feeder lines 14a and 14b, and each workpiece connection end W of the upper and lower terminal blocks 13a and 13b. The sub discharge current returns from each workpiece connection end W of the upper and lower terminal blocks 13a and 13b to the workpiece connection end W of the sub terminal block 13c through the low impedance material 42.

In the fourth embodiment, it is possible to make the single electrode lines have appropriate inductances to enable to have higher impedances than the impedances of the upper and lower main-feeder lines 14a and 14b, thereby enabling to ensure the independence of one-side feeding just as in the first embodiment while making the simplification of circuit.

When a discharge position needs to be reflected on machining control, if a current sensor is mounted on each of the single electrode lines 41a and 41b as explained in the second embodiment (FIG. 2) or a current limiting element inserted in each of the single electrode lines 41a and 41b as explained in the third embodiment (FIG. 3), the discharge position can be detected.

Furthermore, when sub discharge current needs to be intensified, the auxiliary capacitors 22a and 22b have only to be provided between the upper and lower conducting terminals 4a and 4b, respectively as explained in the second embodiment (FIG. 2).

Fifth Embodiment

Figure 5:
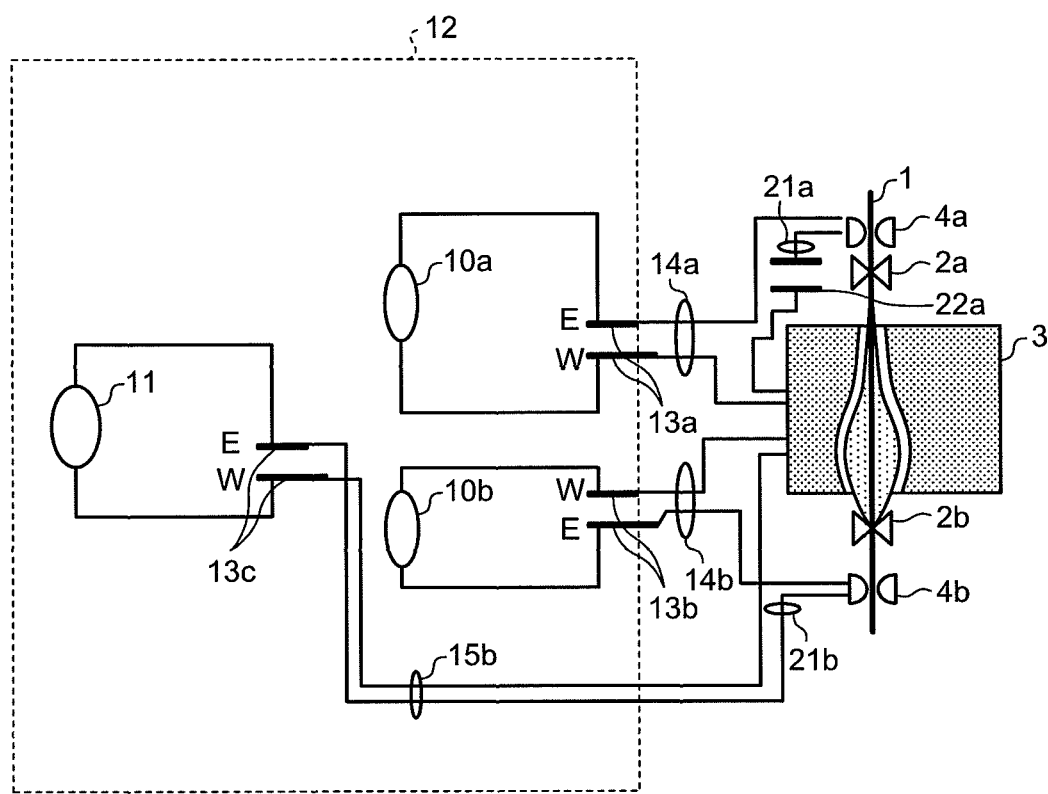
FIG. 5 is a schematic diagram illustrating a configuration of a power supply of a wire electrical discharge machining apparatus according to a fifth embodiment of the present invention.
Figure 6:
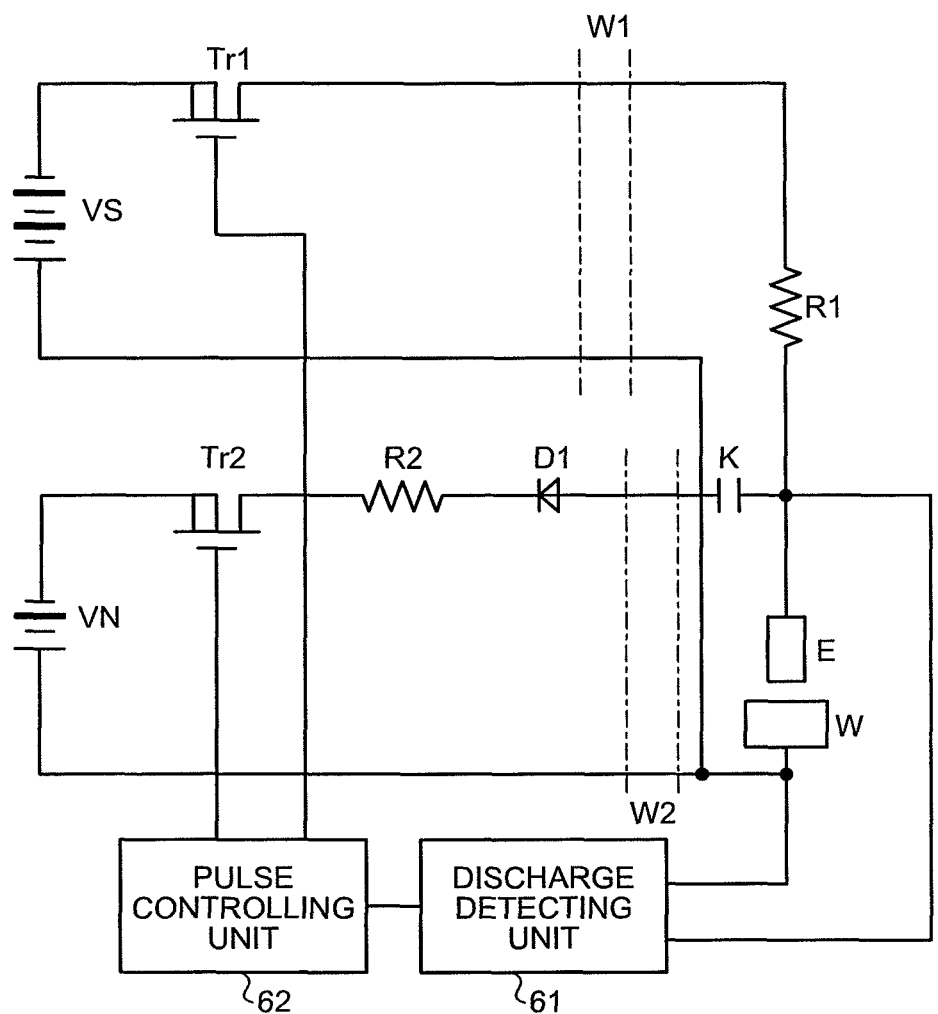
FIG. 6 is a circuit diagram illustrating a configuration of a wire electrical discharge machining apparatus disclosed in Patent Document 1.
Figure 7:
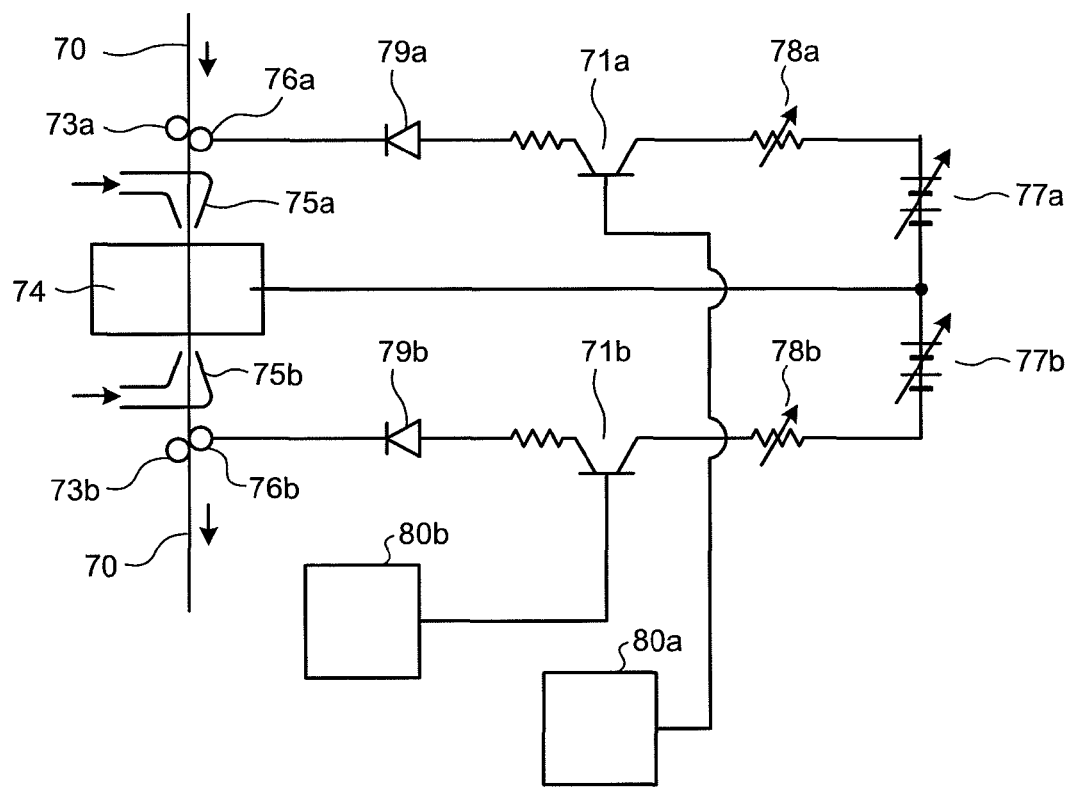
FIG. 7 is a circuit diagram illustrating a configuration of a wire electrical discharge machining apparatus disclosed in Patent Document 3.
Figure 8:
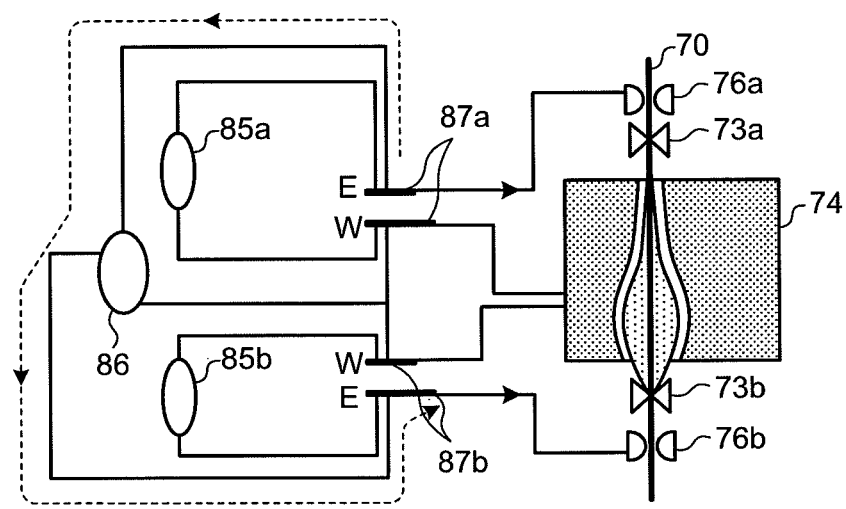
FIG. 8 is a circuit diagram showing an example of connections between each one of two main-discharge power supplies and the inter-electrode gap and, and between a sub-discharge power supply and the inter-electrode gap configured using a conventional technology when configuring a wire electrical discharge machining apparatus capable of measuring discharge position using the two independent main-discharge power supplies for upper-side feeding and lower-side feeding, and using the sub-discharge power supply.

FIG. 5 is a schematic diagram illustrating a configuration of a power supply of a wire electrical discharge machining apparatus according to a fifth embodiment of the present invention. In FIG. 5, the components that are the same or similar to those shown in FIG. 1 (first embodiment) and FIG. 2 (second embodiment) are denoted by the same reference numeral. The components related to the fifth embodiment are mainly explained here.

As shown in FIG. 5, in the fifth embodiment, out of the upper and lower sub-feeder lines 15a and 15b in the configuration shown in FIG. 1 (first embodiment), for example, the lower sub-feeder line 15b is adopted and the upper sub-feeder line 15a is not adopted. That is, in an example shown in FIG. 5, there is no connection between the sub terminal block 13c and the upper conducting terminal 4a, and between the sub terminal block 13c and the workpiece 3.

The auxiliary capacitor 22a shown in FIG. 2 (second embodiment) is connected between the upper conducting terminal 4a and the workpiece 3, the current sensor 21a shown in FIG. 2 (second embodiment) is connected between this auxiliary capacitor 22a and the upper conducting terminal 4a, and, for example, in the homeward path of the lower sub-feeder line 15b, a current sensor 21b shown in FIG. 2 (second embodiment) is mounted.

In FIG. 5, during non-discharge, when a voltage pulse for sub discharge is applied from the sub-discharge power supply 11 between a wire electrode connection E side of the sub terminal block 13c and a workpiece connection end W side, charging current flows through the path of an outward path of the lower sub-feeder line 15b, the lower conducting terminal 4b, the wire electrode 1, the upper conducting terminal 4a, the auxiliary capacitor 22a, the workpiece 3, and a homeward path of the lower sub-feeder line 15b to charge up the auxiliary capacitor 22a.

When the sub discharge occurs at an inter-electrode gap, the sub discharge current from the sub-discharge power supply 11 is supplied to the lower conducting terminal 4b through the outward path of the lower sub-feeder line 15b, and at the same time, the current is also supplied from the auxiliary capacitor 22a to the upper conducting terminal 4a.

As mentioned above, during the sub discharge, because the current can be supplied to an inter-electrode gap from the upper and lower conducting terminals 4a and 4b, it is possible to prevent useless discharge and to perform a stable machining just as in the first embodiment. Also, as is understandable from the explanation of operation described above, because the capacity of the auxiliary capacitor 22a is required to be equal to the supplying capacity of the sub-discharge power supply 11, it only needs to be, for example, about 10 nF to 80 nF, though it depends on design concept.

Also, even if one-side feeding is carried out during main discharge, because there is no path that current flows in from other conducting terminals through the sub-discharge power supply 11, independence of one-side feeding can be ensured just as in the first embodiment.

Furthermore, if the auxiliary capacitor 22a is sufficiently charged up and in a stable state, because nearly equal current flows from the upper and lower conducting terminal 4a and 4b to the inter-electrode gap when the sub discharge occurs, discharge position can be detected using the current sensors 21a and 21b just as in the second embodiment.

In addition, an opposite configuration to that shown in FIG. 5 is also possible. That is, out of the upper and lower sub-feeder lines 15a and 15b, when the upper sub-feeder line 15a is adopted and the lower sub-feeder line 15b is not adopted, an auxiliary capacitor 22b shown in FIG. 2 (second embodiment) is connected between the lower conducting terminal 4b and the workpiece 3, the current sensor 21b shown in FIG. 2 (second embodiment) is connected to a connection line between this auxiliary capacitor 22b and the lower conducting terminal 4b, and the current sensor 21a shown in FIG. 2 (second embodiment) is mounted on the outward path of the upper sub-feeder line 15a. It will be obvious that the similar effect of action can be obtained with this configuration.

As described above, according to the fifth embodiment, while making the simplification of wiring, independence of one-side feeding can be ensured, current can be evenly supplied from the upper and lower feeding points to the inter-electrode gap during the sub discharge, and the measurement of discharge position can be performed just as in the second embodiment.

INDUSTRIAL APPLICABILITY

As described above, a wire electrical discharge machining apparatus according to the present invention is advantageously used as a power supply configuration to evenly supply current from upper and lower feeding points to an inter-electrode gap during sub discharge by a sub-discharge power supply while maintaining the independence between the upper and lower feeding points when upper and lower feeding power supplies are independently provided as main-discharge power supplies; the wire electrical discharge machining apparatus enables, in particular, to measure discharge position, enables to perform a stable machining control by preventing useless discharge from occurring, and is suitable as a power supply configuration capable of correcting an error of machining shape caused by wire vibration by controlling the machining energy in the thickness direction of a workpiece.

The invention claimed is:

1. A wire electrical discharge machining apparatus, in which upper and lower conducting terminals are arranged in sliding contact with a wire electrode that runs in an up-down direction at at least one point of upper position and at at least one point of lower position of the wire electrode, respectively, and a workpiece is arranged to be opposed to the wire electrode between the upper and the lower conducting terminals having a predetermined machining gap between the wire electrode and the workpiece, wherein the wire electrical discharge machining apparatus includes a machining power supply for supplying a discharge current between the wire electrode and the workpiece by applying a discharge voltage to the upper and the lower conducting terminals and the workpiece, wherein the machining power supply includes first and second main discharge power supplies that generate main discharge voltages independently of each other, and a sub-discharge power supply that generates a sub-discharge voltage different from the main discharge voltages, the first main discharge power supply is connected between the upper conducting terminal and the workpiece using a first connection line capable to configure a first round-trip path, the second main discharge power supply is connected between the lower conducting terminal and the workpiece using a second connection line capable to configure a second round-trip path, and the sub-discharge power supply is connected between the upper conducting terminal and the workpiece, and between the lower conducting terminal and the workpiece, respectively using third and fourth connection lines that have higher impedances than the impedances of the first and the second connection lines and are capable to configure third and fourth round-trip paths, respectively, wherein the higher impedances of the third and fourth connection lines block a discharge current from flowing into the lower conducting terminal when the first main discharge power supply generates and supplies the main discharge voltage to the upper conducting terminal and block the discharge current from flowing into the upper conducting terminal when the second main discharge power supply generates and supplies the main discharge voltage to the lower conducting terminal.

2. The wire electrical discharge machining apparatus according to claim 1, wherein current sensors are provided in the third and the fourth connection lines, respectively.

3. The wire electrical discharge machining apparatus according to claim 1, wherein under a state in which one of the third and the fourth connection lines is provided and other one is curtailed, a capacitor is connected between the workpiece and a conducting terminal which is not connected to the sub-discharge power supply out of the upper and lower conducting terminals.

4. The wire electrical discharge machining apparatus according to claim 1, wherein under a state in which one of the third and the fourth connection lines is provided and other one is curtailed, a capacitor is connected between the workpiece and a conducting terminal which is not connected to the sub-discharge power supply out of the upper and lower conducting terminals, and a current sensor is provided in the one connection line.

5. The wire electrical discharge machining apparatus according to claim 1, wherein during the time while a main discharge current is supplied from the first and the second main discharge power supplies, a unit for making high impedance by disconnecting a connection between the third connection line, the upper conducting terminal and the workpiece, and disconnecting a connection between the fourth connection line, the lower conducting terminal and the workpiece, respectively.

6. A wire electrical discharge machining apparatus, in which upper and lower conducting terminals are arranged in sliding contact with a wire electrode that runs in an up-down direction at at least one point of upper position and at at least one point of lower position of the wire electrode, respectively, and a workpiece is arranged to be opposed to the wire electrode between the upper and the lower conducting terminals having a predetermined machining gap between the wire electrode and the workpiece, wherein the wire electrical discharge machining apparatus includes a machining power supply for supplying a discharge current between the wire electrode and the workpiece by applying a discharge voltage to the upper and the lower conducting terminals and the workpiece, wherein the machining power supply includes first and second main discharge power supplies that generate main discharge voltages independently of each other, and a sub-discharge power supply that generates a sub-discharge voltage different from the main discharge voltages, and the first main discharge power supply is connected between the upper conducting terminal and the workpiece using a first connection line capable to configure a first round-trip path, the second main discharge power supply is connected between the lower conducting terminal and the workpiece using a second connection line capable to configure a second round-trip path, the sub-discharge power supply is connected between the upper conducting terminal and the workpiece, and between the lower conducting terminal and the workpiece using third and fourth connection lines, respectively that have higher or nearly equal impedances to the impedances of the first and the second connection lines and are capable to configure a third round-trip path, and a first current limiting element is connected between the sub-discharge power supply and a first terminal provided in an outward path of the third connection line, and a second current limiting element is connected between the sub-discharge power supply and a second terminal provided in an outward path of the fourth connection line.

7. The wire electrical discharge machining apparatus according to claim 6, wherein the two current limiting elements have different values.

8. The wire electrical discharge machining apparatus according to claim 6, wherein a unit for detecting a discharge position based on an amount of limiting current at each one of the two current limiting elements.

9. The wire electrical discharge machining apparatus according to claim 6, wherein the third and the fourth connection lines are curtailed, respectively, and one end of the sub-discharge power supply is connected to the outward paths of the first and second connection lines, respectively through a current limiting element corresponding to one of the two current limiting elements, and another end of the sub-discharge power supply is connected to homeward paths of the first and the second connection lines, respectively.

10. A wire electrical discharge machining apparatus, in which upper and lower conducting terminals are arranged in sliding contact with a wire electrode that runs in an up-down direction at at least one point of upper position and at at least one point of lower position of the wire electrode, respectively, and a workpiece is arranged to be opposed to the wire electrode between the upper and the lower conducting terminals having a predetermined machining gap between the wire electrode and the workpiece, wherein the wire electrical discharge machining apparatus includes a machining power supply for supplying a discharge current between the wire electrode and the workpiece by applying a discharge voltage to the upper and lower conducting terminals and the workpiece, wherein the machining power supply includes first and second main discharge power supplies that generate main discharge voltages independently of each other, and a sub-discharge power supply that generates a sub-discharge voltage different from the main discharge voltages, and the first main discharge power supply is connected between the upper conducting terminal and the workpiece using a first connection line capable to configure a first round-trip path, the second main discharge power supply is connected between the lower conducting terminal and the workpiece using a second connection line capable to configure a second round-trip path, and one end of the sub-discharge power supply is connected to the upper and lower conducting terminals, respectively using a third and a fourth connection lines that have higher impedances than the impedances of the first and the second connection lines and configure only outward paths, and another end of the sub-discharge power supply is connected to homeward paths in the first and the second connection lines using a low impedance material, wherein the higher impedances of the third and fourth connection lines block a discharge current from flowing into the lower conducting terminal when the first main discharge power supply generates and supplies the main discharge voltage to the upper conducting terminal and block the discharge current from flowing into the upper conducting terminal when the second main discharge power supply generates and supplies the main discharge voltage to the lower conducting terminal.

11. The wire electrical discharge machining apparatus according to claim 10, wherein capacitors are connected between the upper and the lower conducting terminals and the workpiece, respectively.

12. The wire electrical discharge machining apparatus according to claim 10, wherein current sensors are provided in the third and the fourth connection lines, respectively.

13. The wire electrical discharge machining apparatus according to claim 10, wherein current limiting elements are provided in the third and the fourth connection lines, respectively.

14. The wire electrical discharge machining apparatus according to claim 10, wherein capacitors are connected between the upper and the lower conducting terminals and the workpiece, respectively, and current sensors or current limiting elements are provided in the third and the fourth connection lines, respectively.

15. The wire electrical discharge machining apparatus according to claim 1, wherein the first and second connection lines are low impedance coaxial cables.

16. The wire electrical discharge machining apparatus according to claim 15, wherein the third and fourth connection lines are twisted pair cables having higher impedance than the low impedance coaxial cables.

17. The wire electrical discharge machining apparatus according to claim 1, wherein the third connection line includes a first upper cable and a second upper cable, the first upper cable being connected to the upper conducting terminal and the second upper cable being connected to the workpiece, and wherein the fourth connection line includes a first lower cable and a second lower cable, the first lower cable being connected to the lower conducting terminal and the second lower cable being connected to the workpiece.

* * * * *